US007010727B1

(12) United States Patent
Stucker

(10) Patent No.: US 7,010,727 B1
(45) Date of Patent: Mar. 7, 2006

(54) METHOD AND SYSTEM FOR NEGOTIATING COMPRESSION TECHNIQUES TO BE UTILIZED IN PACKET DATA COMMUNICATIONS

(75) Inventor: Brian Stucker, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 482 days.

(21) Appl. No.: 10/171,526

(22) Filed: Jun. 12, 2002

Related U.S. Application Data

(60) Provisional application No. 60/298,758, filed on Jun. 15, 2001.

(51) Int. Cl.
*G06F 11/00* (2006.01)

(52) U.S. Cl. ......................................... 714/52; 709/247
(58) Field of Classification Search ................... 714/52, 714/37, 39, 48, 18, 27, 758, 759, 749; 709/246, 709/247

See application file for complete search history.

(56) References Cited

U.S. PATENT DOCUMENTS

| | | | | |
|---|---|---|---|---|
| 5,131,016 A | * | 7/1992 | Broughton et al. | 375/240 |
| 5,452,341 A | * | 9/1995 | Sattar | 379/88.27 |
| 6,405,037 B1 | * | 6/2002 | Rossmann | 455/426.1 |
| 2003/0005280 A1 | * | 1/2003 | Bobde et al. | 713/150 |

OTHER PUBLICATIONS

M. Handley, H. Schulzrinne, E. Schooler, J. Rosenberg, Internet Engineering Task Force Request for Comment 2543—SIP: Session Initiation Protocol, Mar., 1999.

Hannu et al., "RObust GEeneric message size Reduction (ROGER)",Ericsson, Sweden, Internet Draft, Feb. 23, 2001.

Hannu et al., "Application Signalling Over Cellular Links", Ericsson, Sweden, Internet Draft Mar. 2, 2001.

Liu et al., "Scalable Robust Efficient Dictionary-Based Compression (SCRIBE)", Nokia Research Center, Internet Draft Mar. 22, 2001.

* cited by examiner

*Primary Examiner*—Nadeem Iqbal
(74) *Attorney, Agent, or Firm*—Haynes and Boone, LLP

(57) ABSTRACT

Disclosed is one embodiment of a system and method for negotiating a compression technique while signaling is occurring in a communications network, the method comprising sending a message with a compression negotiation indicator, receiving a response to the message, determining if the response contains an error code in response to the compression header, if the message contains an error code, then continuing signaling without using compression techniques. On the other hand, if the message does not contain an error code, then the method negotiates a compression technique and may continue signaling with the negotiated compression technique.

20 Claims, 8 Drawing Sheets

METHOD AND SYSTEM FOR NEGOTIATING COMPRESSION TECHNIQUES TO BE UTILIZED IN PACKET DATA COMMUNICATIONS

CROSS REFERENCE

This application claims the benefit of the filing date of U.S. provisional patent application Ser. No. 60/298,758, filed on Jun. 15, 2001, the disclosure of which is incorporated herein by reference.

TECHNICAL FIELD

The invention relates in general to telecommunications and packet data communication networks.

BACKGROUND INFORMATION

Telecommunication service providers are constantly looking for new ways to deliver personalized, differentiated, real-time multimedia services, such as collaborative meetings and subscriber-initiated service management. By incorporating Voice over Internet Protocol ("IP") capabilities, new features can be provided to users of existing communications networks. Furthermore, such technologies allow for the integration of voice, video, and data capabilities over an IP network using a single packet infrastructure.

One emerging protocol for Voice over IP applications is Session Initiation Protocol ("SIP"). Currently, SIP is a draft protocol published by the Internet Engineering Task Force ("IETF"), which is the body responsible for administering and developing the mechanisms that comprise the Internet. A formal definition of SIP can be found in IETF's Request For Comment ("RFC") 2543—SIP: Session Initiation Protocol. This document may be found at http://www.faqs.org/rfcs and is incorporated by reference its entirety into this application.

SIP is a signaling protocol used for establishing sessions in an IP network. It is an ASCII-based, application layer control protocol that can be used to establish, maintain, and terminate sessions between two or more end points. A session could be a simple two-way telephone call or it could be a collaborative multi-media conference session. SIP, however, does not control the actual session. It just provides the signaling so that a session can be established. SIP's basic architecture is client/server in nature. There are two main components with a SIP network: the SIP user agent and the SIP network server. The user agent is effectively the "endpoint" or end system component for the session or call. The SIP server is the network device that handles signaling associated with multiple calls. Either the SIP server or the end point can function as the client or server, depending on which component is making the request (i.e., the client) and which component is providing a response (i.e., the server).

SIP is based on a request-response philosophy. As such, it closely resembles Hypertext Transfer Protocol ("HTTP") and Simple Mail Transfer Protocol ("SMTP") which are widely used throughout the Internet. Users in a SIP network are identified by unique SIP addresses. A SIP address is similar to an e-mail address and is in the format of sip:userID@network.com. As will be discussed in detail below, users register with a registrar server using their assigned SIP addresses. When a caller initiates a call, a SIP request is sent to a SIP server. The request includes the address of the caller (in the From header field) and the address of the intended called user (in the To header field). If the called user had previously registered with the network, the SIP server knows where to direct the message. The called user may then respond to the server, which forwards the response to the caller. After acknowledgements of both parties, a session may then be established between the caller and the called user.

Although the overhead of a text-based signaling protocol, such as SIP, has relatively low overhead, there are problems associated with the size of the messages in relation to call setup time. In order to achieve a call setup time in a low bandwidth SIP network that is on par with other technologies, or to reduce message sizes on any network, compression must be performed.

Well known compression techniques, such as ROGER, have been developed as possible compression solutions. Such techniques provide a method for compressing the entire SIP message over the life of the SIP signaling session. These techniques have significantly reduced the amount of bandwidth required for setting up a session, which in turn, have reduced the call setup interval.

In order to use compression techniques, such as ROGER, however a means of compression negotiation must be utilized. What is needed, therefore, is a system and method of compression negotiation during a SIP signaling session.

SUMMARY OF THE INVENTION

The previously mentioned needs are fulfilled with the present invention. Accordingly, there is provided, in a first form, a method for negotiating a compression technique while signaling is occurring in a communications network, the method comprising sending a message with a compression negotiation indicator, receiving a response to the message, determining if the response contains an error code in response to the compression header. If the message contains an error code, then continuing signaling without using compression negotiation techniques. On the other hand, if the message does not contain an error code, then the method negotiates a compression technique and may continue signaling with the negotiated compression technique.

These and other features, and advantages, will be more clearly understood from the following detailed description taken in conjunction with the accompanying drawings. It is important to note the drawings are not intended to represent the only form of the invention.

DETAILED DESCRIPTION OF THE INVENTION

One embodiment of the present invention provides a unique method and system for performing compression negotiation between two points in a network, such as a SIP network. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

Figure 1:
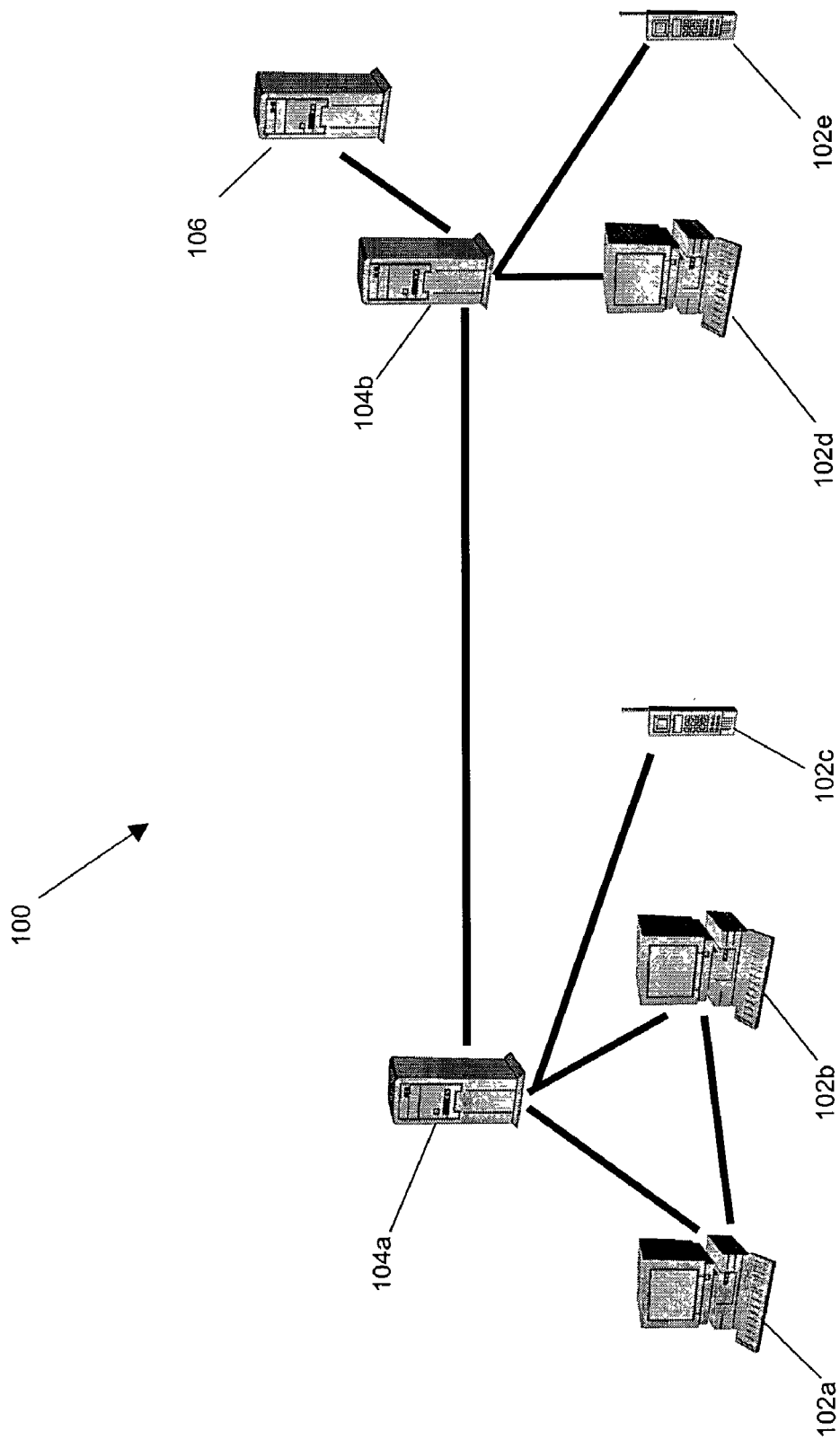
FIG. 1 illustrates an exemplary network incorporating one aspect of the present invention.

Referring to FIG. 1, an exemplary communications system and network 100 is shown for implementing various embodiments of the present invention. For the sake of example, the network/system 100 utilizes SIP protocols. SIP end points or user devices 102a–102e have dual client and server roles. When initiating SIP calls, user devices are known as user agent clients ("UACs"). However, these user devices are known as user agent servers ("UASs") when responding to requests. This dual function allows peer-to-peer calls to be made using a client-server protocol. Some user devices 102a–102e, therefore, can communicate with each other directly or via SIP servers 104a–104b.

SIP servers 104a and 104b have the capability to behave as proxy or redirect servers. Proxy servers receive SIP requests, determine where to send the requests, and forward the requests to the next SIP server in the network (using next hop routing principals). Numerous hops can take place before the message from the client reaches the final destination. Proxy servers can also provide functions such as authentication, authorization, network access control, routing, and security.

Redirect servers also receive requests, but rather than forwarding the request on to the next server, redirect servers send a response back to the user agent. The response may include the address for the called user so that the caller can contact the called user directly.

In the network illustrated in FIG. 1, the SIP server 104b is coupled to a location server 106. In SIP networks, location servers are used to track the location of users. For instance, to notify the system 100 that a user at the user device 102a is "logged" into the network, the user device 102a sends a registration request to the server 104a. In response, the server 104a forwards the request to the server 104b which stores the registration information in the location server 106 via a non-SIP protocol. Later, when an appropriate proxy server (e.g., server 104b) receives a request from another user or caller addressed to the user at device 102a, the proxy server 104b will be able to locate the called user by accessing the location information stored in the location server 106. The proxy server 104a will then use the location information in forwarding the request to the called user at device 102a.

In wireless networks, such as 3G, the proxy server contains the Call/Session Control Functions ("CSCF"). The Proxy CSCF ("P-CSCF") provides a first point of contact for the mobile device. All signaling to and from the mobile device goes through the P-CSCF. In terms of SIP, it behaves as an outbound proxy. In a 3G network, the main purpose for this node is to provide emergency service breakout and to do some basic message manipulation to enable a visited domain operator to provide locally sensitive services (e.g. traffic reports, directory services, etc). The proxy server could also perform simple number internationalization (which allows the support of local dial-in plans). In some networks, the proxy server may also play a role in quality of service reservations. Because of this functionality, the proxy server or "P-CSCF" can be considered the primary SIP node in the wireless network. A user device, for instance, user device 102a, registers on start-up with a proxy server. In some networks, a user device always has a proxy server associated with it. The proxy server is located in the same network as the user device, performs resource authorization, and may have additional functions in handling of emergency calls. The proxy server is according to known methods. As a result of the registration procedure, the proxy server determines the next hop toward the serving CSCF ("S-CSCF"). This next hop may be directly to the S-CSCF, or to an intermediate server or "I-CSCF" who forwards the request to the S-CSCF.

For instance, assume the user device 104a is named "Saturn.bell-tel.com" and the proxy server 104a, which as been associated with the user device 104a, is named "bell-tel.com", then the user device may send a registration message similar to the following:

REGISTER sip:bell-tel.com SIP/2.0
Via: SIP/2.0/UDP saturn.bell-tel.com
From: <sip:user@bell-tel.com>
To: <sip:user@bell-tel.com>
Call-ID: 1234561789@1.2.3.4
CSeq: 1 REGISTER
Contact: <sip:user@111.22.33.44>
Expires: 7200

As illustrated above, a typical SIP registration request from a user device contains the user's home name in the "To" field, the user's home name in the "From" field, and the IP address is the "Contact" field. There may be other information in the registration message. For instance, the above registration expires after two hours.

In response to receiving the registration request, the proxy server 104a could send a message similar to the following back to the user device:

SIP/2.0 200 OK
Via: SIP/2.0/UDP saturn.bell-tel.com
From: <sip:user@bell-tel.com>
To: <sip:user@bell-tel.com>
Call-ID: 1234561789@1.2.3.4
CSeq: 1 REGISTER
Contact: <sip:user@111.22.33.44>
Expires: 7200

Additionally, the proxy server 104a sends the user's location to the location server 106 via the server 104b. As discussed previously, the location server 106 maintains a contact list for each user in the network. The contact list includes addresses where the user may be located. When the contact list is sent to a proxy server (e.g. server 104a), the proxy server uses the addresses in the contact list to create or modify the address information in the SIP Invite message before forwarding the message onto the user.

Once the user is registered with the network 100, callers may now contact the user via the network. For instance, when a caller wishes to talk to the user, pursuant to SIP protocol, the caller sends an "Invite" request to the user. In the illustrative example, this is accomplished by a computer or SIP enabled user device, for instance, device 102e sending an "Invite" request to the proxy server 104b. In accordance with SIP protocol, the user name would be in the "Invite" field and the "To" field. The caller's user name (e.g., "caller") would be in the "From" field. Thus, the Invite request for the illustrative example might contain the following header lines:

Invite: sip:user@bell-tel.com
To: sip:user@bell-tel.com
From: sip: caller @bell-tel.net In response to receiving the request, the proxy server 104b queries its location server 106 to determine the user's current IP address. The proxy server 104b then forwards the Invite request to device 102a, which is where the user is located. After receiving the Invite request, the user device 102a sends an acknowledgement back to the caller. A session may then be established between the caller and the guest user. At this point, Real-time Transfer Protocol ("RTP") is used for the communication between the caller and the user.

As previously discussed, although the overhead of a SIP signaling protocol in relation to the traffic overhead of a media stream such as conversational voice is very low, there are still problems associated with the size of the messages in relation to call setup time. In order to achieve a call setup time (call initiation to ringing) under a wireless SIP network (e.g., 3GPP) that is on par with existing wireless technologies, some type of compression methodology should be performed. In order to use compression schemas, however, a means of compression negotiation, context repair, and feedback should be provided in order to achieve a complete, workable solution to address the problem.

The compression may occur between any two points in the network. In a wireless network, the radio links are likely to have limited bandwidth. Furthermore, at such links, techniques such as encryption are most likely to be employed. It may be preferable to apply compression ahead of any form of encryption, both content and the entire SIP message itself, because applying compression to a properly encrypted message would yield little or no gains in terms of decreasing the message size, and in fact, could just make it larger.

In a wireless network, the proxy server is most likely the last SIP entity that will have potential access to a fully unencrypted form of the SIP message before sending to the user device. Therefore, the proxy server may be the preferable location in which to apply compression. For these reasons, a compression negotiation agent may be implemented at the proxy server and the user device. Other nodes in the network may additionally support the compression negotiation, however, care may need to be taken at other nodes to assure that they do not exhaust their session key address space in the process.

One embodiment of the present invention uses SIP signaling to determine whether compression procedures may be performed. For instance, the proxy server may be configured to use compression techniques, but the mobile device may not be equipped to use compression techniques or vice versa. Additionally, the proxy server and the mobile device may be equipped to use different compression techniques. Thus, compression may only take place when both the mobile device and the proxy server are equipped to use compression and can agree upon a compression technique.

Figure 2:
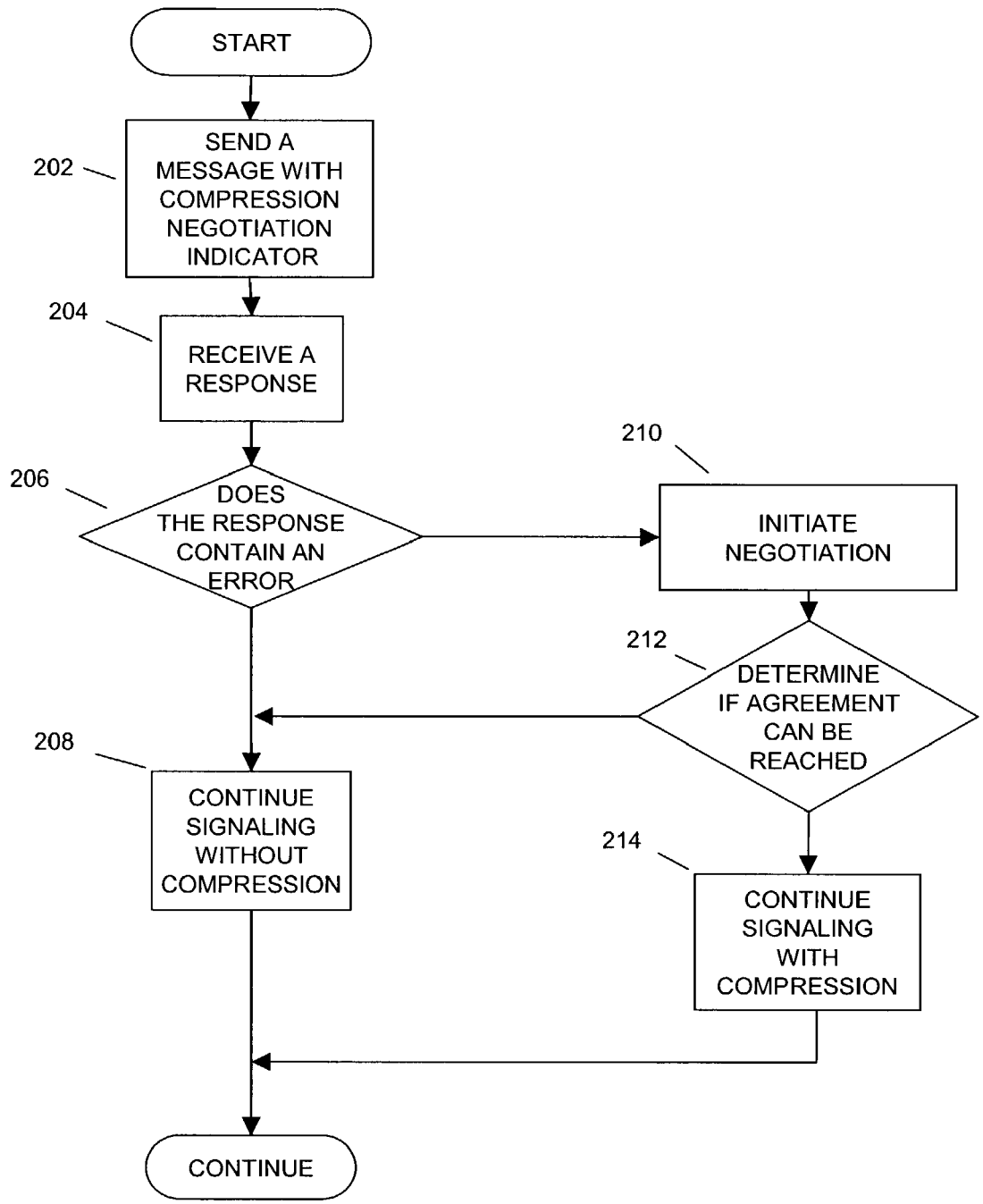
FIG. 2 illustrates a method incorporating one aspect of the present invention.

When sending a particular type of message, for instance, upon registration, one node (e.g., the mobile device) could include an indicator that compression is available within the REGISTER message. If the other node (e.g., proxy sever) does not support compression, it will then reject the registration request because of the unsupported indicator being present. The sending node would then assume that the network does not support compression and send the registration request without the indicator. FIG. 2 illustrates a method for this aspect of the present invention. In step 201, a node (either a mobile device or a proxy server) sends a message containing a "compression indicator" to another node in the network. As an illustrative example, assume the message is a registration message from the mobile device 102a to the proxy server 104a. The compression indicator could be in the form of a proxy require statement. For instance, an example registration request might contain the following header lines:

REGISTER sip:bell-tel.com SIP/2.0
Via: SIP/2.0/UDP saturn.bell-tel.com
From: <sip:user@bell-tel.com>
To: <sip:user@bell-tel.com>
Call-ID: 1234561789@1.2.3.4
CSeq: 1 REGISTER
Contact: <sip:user@111.22.33.44>
Proxy-Requires: sipcomp
Expires: 7200

The above Registration request contains a "Proxy-Requires" statement. The term "SIPCOMP" notifies the receiving node that compression negotiation is available. If the receiving node, which in this example is the proxy server 104a, is equipped to provide compression negotiation, the proxy server 104a would return a response such as:

SIP/2.0 200 OK
Via: SIP/2.0/UDP saturn.bell-tel.com
From: <sip:user@bell-tel.com>
To: <sip:user@bell-tel.com>
Call-ID: 1234561789@1.2.3.4
CSeq: 1 REGISTER
Contact: <sip:user@111.22.33.44>
Supported: sipcomp
Expires: 7200

On the other hand, if the proxy server 104a was not equipped for compression negotiation, the proxy server 104a could return an error message, such as:

SIP/2.0 406 Not Acceptable
Via: SIP/2.0/UDP saturn.bell-tel.com
From: <sip:user@bell-tel.com>
To: <sip:user@bell-tel.com>
Call-ID: 1234561789@1.2.3.4
CSeq: 1 REGISTER
Contact: <sip:user@111.22.33.44>
Expires: 7200

Thus, in step 204, the mobile device 102a would receive the response. In step 206, the mobile device 102a would then determine whether the response contained an error code. If the response contains an error code, then mobile device 102a assumes that the proxy server 104a does not support compression negotiation and resends the registration request without the compression negotiation indicator (i.e., without the Proxy-Require statement). The signaling would continue with messages sent in an uncompressed format. However, the mobile device 102a may attempt to include the compression negotiation indicator at the next registration cycle.

On the other hand, if in step 206, the mobile device 102a determined that the response did not contain an error message, the mobile device 102a would assume that the server 104a was equipped to perform compression negotiation. The mobile device 102a could then initiate a negotiation session in step 210. As will be described in greater detail below, in step 212, an agreement on the compression scheme is attempted. If an agreement on the compression scheme can be reached (e.g., both nodes are configured for a common compression scheme), signaling data is then sent in a compressed format (step 214). If an agreement could not be reached (e.g. both nodes are not configured with the same compression schemes), the data will be sent in an uncompressed format (step 208). The compression negotiated may also pertain to data related to the SIP signaling data depending on the compression scheme used.

The Negotiation Session:

During a negotiation session, mobile device 102a and the proxy server 104a communicate with each other to determine if both nodes are configured with a common compression scheme. This communication initially occurs with the sending of a session header containing a session key. After the session header has been sent, directives may be sent between the nodes so that the two nodes may communicate and the negotiation performed.

Session Keys and the Header:

In order to correctly associate compression negotiation with a SIP transaction, a session identification key may be transmitted. In some embodiments, unique session identification keys may be important because for each SIP session a different compression dictionary may be used, therefore in order to correctly compress and decompress messages for that SIP session, the correct dictionary should be indicated.

One aspect of the present invention correlates compression negotiation sessions with the use of session keys which are unique to a particular SIP endpoint and each session that may be initiated by that endpoint. Such a session key may be a two-part key. In the long-key format, the first part is the source IP address (port not included), and a 7-bit number that is calculated at the beginning of each new negotiation session (which is referred to hereafter as the session key, assuming that the IP address is always transmitted). In the short-key format, the 7-bit number is expressed in the header.

In one embodiment of the present invention, only the session key number is expressly transmitted during the signaling process. The second part of the key is obtainable by the IP layer itself as given by a 32-bit representation of the IP address of that network interface. This means that the same proxy server is used for an entire negotiation session. Similarly, if the user changes his IP address, the previous negotiation sessions could not be used and the user would need to renegotiate the compression methodology.

In some embodiments, the session keys are soft-stated, in that they can be thrown away after an arbitrary amount of time by both the node generating the key and any nodes in the network that may be a part of the session that that key identified. In such embodiments, session keys are kept for the duration of the SIP transaction (request to final response) that they were initiated with, and do not expire before any pending sessions are completed. Thus, session keys remain in effect for as long as the latest registration is valid. For example, if a session key was initially negotiated at the beginning of an initiation or "INVITE" call flow, the session key would be kept until the acknowledgement or "ACK" for the INVITE is returned. After that, the session may continue to be used, or be thrown away in favor of negotiating a new key. In some embodiments, the negotiating sessions will perform better when session keys are kept in use because less negotiation will be required.

The Header:

In order to correctly associate the context of a negotiation with a SIP transaction, the session key may be transmitted as part of the SIP signaling using a ephemeral header. In one embodiment, the ephemeral header is incorporated into a regular SIP message as invalid start line using non-ASCII characters. The format of the ephemeral header is such that it can be prefixed to a compressed SIP message. However, it is not to be confused as part of a legal SIP message start line. Should a message with the ephemeral header be sent to a node that does not understand the protocol, the message will be ignored. As a precaution against confusion at the sender's end as to whether the protocol is supported, or the receiving end is not actually receiving the messages sent to it, the proxy-requires statement may be used to determine the capabilities of a proxy before using the ephemeral header. If compression is required for another non-proxy node, a Requires header can also be used to ensure that the ultimate recipient of any messages also supports the protocol.

In terms of where the header and directive relies in relation to the SIP message itself, refer to Table 1:

TABLE 1

SIP Message
Header and Directives
Transport Layer Protocol (TCP, UDP, SCTP, etc.)

In one embodiment, the ephemeral header may have the structure as illustrated in Tables 2a:

TABLE 2a

Long Session Key Format (31-bit session key)

Byte 0 (7 bytes shown):
| Version (0) | Reserved (0) | Reserved (0) | Reserved (0) | DIR(0)/ ACK(1) | DIR/ Retransmit | DIR/ Seq. # | DIR/ Seq. # |
| SK Flag (0) | Session Key (High) | | | | | | |
| Session Key | | | | | | | |
| Session Key | | | | | | | |
| Session Key | | | | | | | |
| Session Key (Low) | | | | | | | |
| CRC | | | | | | | |

As illustrated in Table 2a, the first four bits of the first byte are set to zero. If the fifth bit is not set, the remaining three bits in byte zero (DIR bits) are used to indicate the protocol directive to be undertaken by the recipient. Otherwise, if the fifth bit is set (the ACK bit), the sixth bit is used to designate that a retransmission is requested, and the final two bits are used to designate the sequence number (0–3) of the current message, or the message to be retransmitted. Since this is a long session key header, the leftmost bit (SK Flag) of byte 1 is set to zero to indicate that the next 39 bits denote the session key. The final byte is a cyclic redundancy check byte covering the entire header. A long session key, as illustrated in Table 2a, may be used when more than 127 sessions are necessary at the given node.

TABLE 2b

Short Session Key Format (7-bit session key)

| Byte 0 (3 bytes shown): | | | | | | | |
|---|---|---|---|---|---|---|---|
| Version (0) | Reserved (0) | Reserved (0) | Reserved (0) | DIR(0)/ ACK(1) | DIR/ Retransmit | DIR/ Seq. # | DIR/ Seq. # |
| SK Flag (1) | Session Key | | | | | | |
| CRC | | | | | | | |

Table 2b represents the a short session key format. The significance of the various bits are the same in the short session key format, except that the SK Flag bit is not set. Therefore, only the next 7 bits in byte one denote the session key. Short session keys may be used whenever 127 sessions, or fewer, are in use throughout the signaling path.

In one embodiment, the check byte ("CRC") is calculated on the entire header and uses the polynomial $C(x) = 1+x^2+x^8$, for both short and long session key formats.

The Directives:

As previously discussed, in order to conduct a negotiation session, there are a number of directives which allow the two nodes to communicate with each other. Table 3 lists a possible set of these directives:

TABLE 3

| 000 | INSU | Initiating New Session (Unacknowledged mode). |
|---|---|---|
| 001 | INSA | Initiating New Session (Acknowledged mode). |
| 010 | | Reserved |
| 011 | SA | Session Accepted. |
| 100 | SR | Session Reset. |
| 101 | SC | Session Closed. |
| 110 | CNS | No Codec Supported. |
| 111 | CIRD | CRC Invalid, Retry Directive. |

Several directives will also contain a byte which will contain codecs. In one embodiment, the codecs are indicators of the compression schemes. Some of possible codecs are listed in Table 4.

TABLE 4

| 00000000 | Uncompressed. |
|---|---|
| 00000001 | Adaptive Header Removal |
| 00000010 | LZSS |
| 00000100 | ROGER |
| 00001000 | SCRIBE |
| 00010000 | Undefined. |
| 00100000 | Undefined. |
| 01000000 | Undefined. |
| 10000000 | Undefined. |

In one embodiment, the directives have the structure as illustrated in Tables 5a and 5b:

TABLE 5a

Long Session Key Format (31-bit session key)

| Byte 0 (7 bytes shown): | | | | | | | |
|---|---|---|---|---|---|---|---|
| 0 Codec | 0 Codec | 0 Codec | 0 Codec | 0(DIR) Codec | DIR Codec | DIR Codec | DIR Codec |

TABLE 5a-continued

Long Session Key Format (31-bit session key)

SK Flag (0) Session Key (High)
Session Key
Session Key
Session Key (Low)
CRC

TABLE 5b

Short Session Key Format (7-bit session key)
Byte 0 (4 bytes shown):

| 0 Codec | 0 Co- dec | 0 Co- dec | 0 Co- dec | 0 (DIR) Codec | DIR Codec | DIR Codec | DIR Codec |
|---|---|---|---|---|---|---|---|
| SK Flag (1) | Session Key | | | | | | |
| CRC | | | | | | | |

An extra byte is present in the directive format (byte 0=00001xxx) in order to make space for the codec bitmap. However, this extra byte may not be present for Session Close (SC), Session Reset (SR), and CRC failure (CIRD) messages.

There are two modes in which the illustrative embodiment of the protocol operates: acknowledged, and unacknowledged. In order to establish an unacknowledged session, the INSU directive may be used, and then the ACK bit would not be set for that session. If an acknowledged session is needed, the INSA directive is used, and the ACK bit is set in messages comprising that session once compression has been negotiated. The reason for the two modes is that although SIP can detect some loss of messaging, SIP may not always be able to detect entire messages that are missing due to an unreliable transport mechanism (such as UDP). Those skilled in the art know that the sender of a SIP message always knows if the message made it to the other end, but the receiver may not know that they've missed a message. The sequence bits and the ACK flag in the header assure that during an acknowledged session up to three messages in a row may never be received, but can be detected as missing by the receiver. The sequence bits increment monotonically on each new SIP request or response (but, not on retransmissions). If a sequence number is received out of order, then the recipient can request the interim sequence numbers be retransmitted by selecting the correct sequence number, and setting the retransmit bit in a header sent back to the original sender. This mechanism may be useful when the compression algorithm negotiated uses dynamic data based on messages received/sent in order to build the associated compression dictionary.

Since SIP has it's own retransmission process present, there is no need to define an additional retransmission process. Furthermore, using the existing mechanism in SIP will reduce overhead. However, using the existing SIP process may limit the usability of the acknowledged mode to simply marking the messages with a sequence number when using UDP. Otherwise, acknowledged mode should generally not be utilized.

The Session Reset (SR) directive is used only in acknowledged mode to signal to the other end that the compression session has ended, and any dynamic dictionary information can be discarded, but that the session key is still valid for future use.

The Session Close (SC) is used to signify that the session key is no longer valid, and that no further compression should be attempted using that session key. The difference between SC and SR is that when an SC is sent the entire compression context is no longer valid (if one existed). All resources related to that compression session should be deallocated or released. If an SC is received and compression is desired, a new key needs to be negotiated to select a codec. Otherwise, the SIP message should be retransmitted without an ephemeral header using no compression in unacknowledged mode.

The ACK Format Header:

The ACK command is used as a mechanism for compression techniques that do not provide a retransmission/ordering mechanism internally, to have the opportunity to run over User Datagram Protocol with a degree of reliability to them. When acknowledged mode session is negotiated, each SIP message from that point on, after the negotiation session is accepted, should carry the ACK format header. Additionally, whenever a compression codec is selected, even in unacknowledged mode, the ACK format header may be carried in order to transport the session key that applies to the payload. The structure of the ACK format header is illustrated in Tables 6a and 6b:

TABLE 6a

Long Session Key Format (31-bit session key)

Byte 0 (6 bytes shown):

| 0 | 0 | 0 | 0 | 1(ACK) | Retransmit | Seq. # | Seq. # |
|---|---|---|---|--------|------------|--------|--------|

SK Flag (0)   Session Key (High)
Session Key
Session Key
Session Key (Low)
CRC

TABLE 6b

Short Session Key Format (7-bit session key)

Byte 0 (3 bytes shown):

| 0 | 0 | 0 | 0 | 1(ACK) | Retransmit | Seq. # | Seq. # |
|---|---|---|---|--------|------------|--------|--------|

SK Flag (1)   Session Key
CRC

If the retransmit bit is set (1), then the message identified in the sequence number should be resent by the receiver. Sequence numbers should start at 0 and increment sequentially up to 3 before wrapping back around to 0. Therefore, no message more than 3 messages ago should be requested for retransmission at any time. If a header is received with the retransmit bit set the recipient should use the sender's ACK header, reset the retransmit bit to zero, re-calculate the CRC value, and send the requested SIP message along with the updated header, back to the sender. The retransmission bit is intended to be utilized as a NACK mechanism, meaning a negative acknowledgement, or acknowledgment that something is missing, in which one end signifies the missing message in the sequence. It is possible that the receiver could queue the last four messages and wait to see if one is simply received out of order before sending a retransmission request, this is left as an implementation detail as it does not affect as a protocol, but could impact performance. The view however, is that it is more likely that a packet (in the case of UDP) is simply lost, rather than received out of order.

Operation:

In order to operate in a network, the SIPCOMP header is transported by being pre-pended to regular SIP messages, as described in the previous sections.

In operation, one mode, such as the device 102 will open a negotiation session with the proxy server 104*a* (depending on the call flow direction) by using the appropriate directives to signal the creation of a new acknowledged (INSA), or unacknowledged (INSU) session. Included in this process are the codecs supported at each node. Should the receiving node accept the requested codec, a session accepted (SA) directive may be returned. On the other hand, if all the requested codecs are rejected, then a codec not supported (CNS) directive may be sent to the originator.

If a CNS directive is received in response to an INSA directive, a codec that was not initially selected may be returned. If the originator wishes to accept the codec signified in the CNS, the originator may return a SA directive, otherwise the originator may return an SA signifying uncompressed by selecting no codec (all codec bits set to zero). The negotiation recipient should never send a CNS to a session initiation when no codec (uncompressed) is selected. This process allows the originating node to limit the initial choices to what is preferred, rather than what is supported, but still wind up with compression should both ends support an alternate (but not preferred) codec. Each end may not reselect a previously rejected codec, however, in order to prevent loops from forming during the negotiation.

Figure 3:
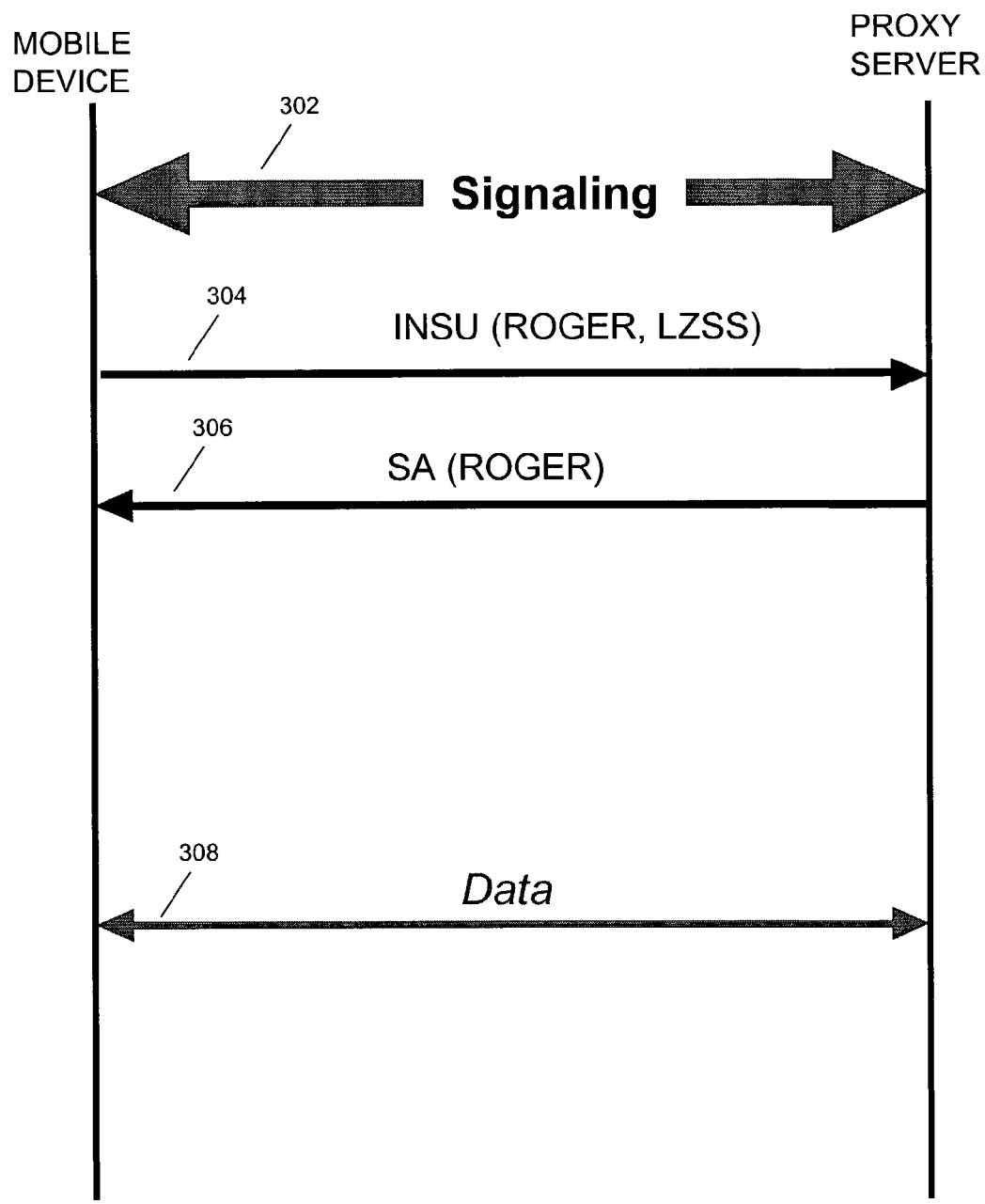
FIG. 3 illustrates a call-flow sequence incorporating another aspect of the present invention.

An example call flow is illustrated in FIG. 3, where a codec is negotiated. In the example of FIG. 3, assume the mobile device 102*a* and the proxy server 104*a* are currently in communication (step 302). Further assume that the mobile device 102*a* prefers to use ROGER or LZSS as the compression mechanism. Thus, in step 304, the mobile device 102*a* would send an INSU directive containing the codecs representing ROGER and LZSS to the proxy server 104a. In response, in step 306 the proxy server 104a sends a SA directive containing the codec representing ROGER to the mobile device 102a. The mobile device 102a then knows to use ROGER as a compression technique, and compressed data may now be sent (step 308). In this example, the process added 14 bytes to the overall message flow as overhead to the SIP messaging in long format, or 8 bytes in short format.

Figure 4:
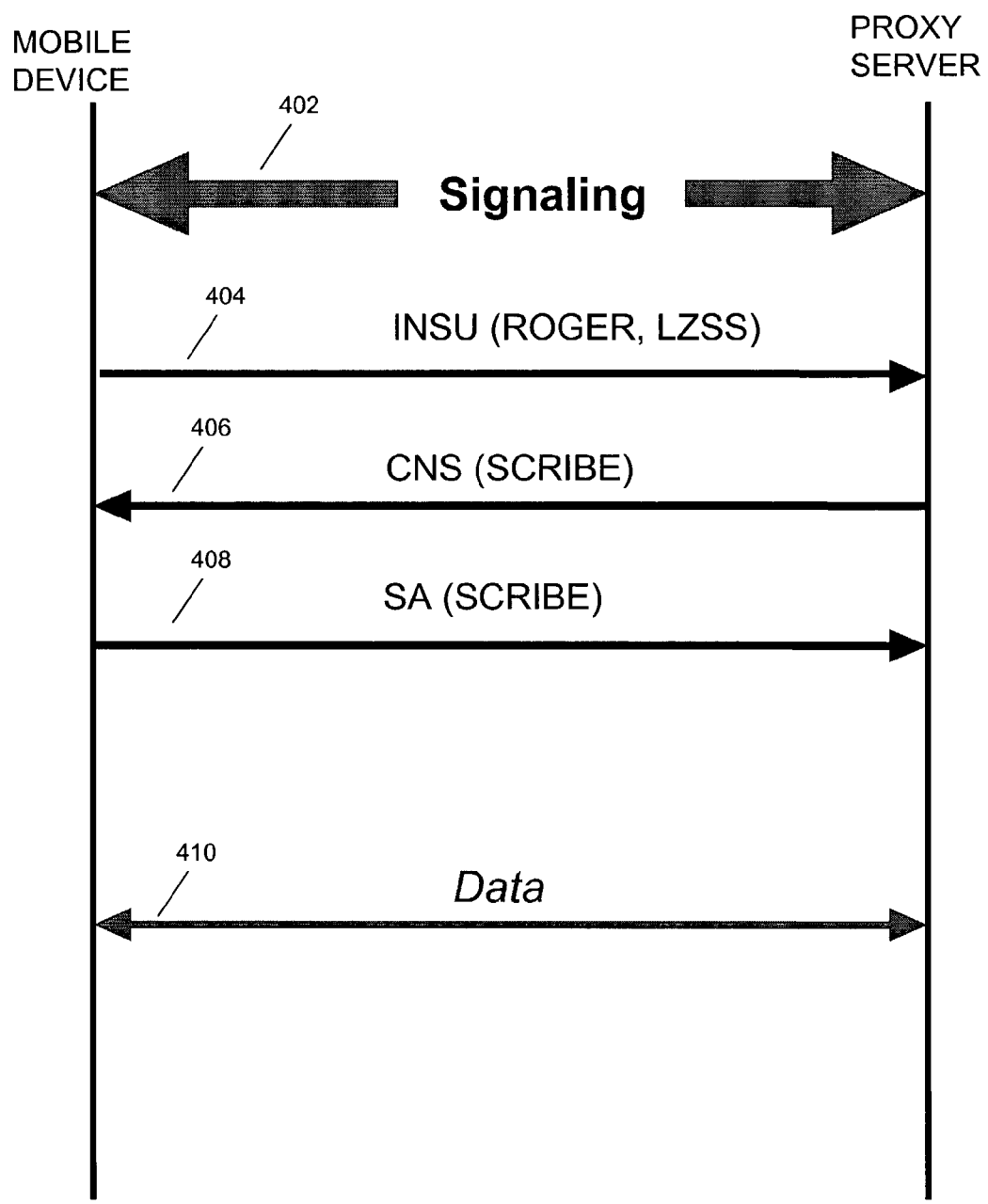
FIG. 4 illustrates a call-flow sequence incorporating another aspect of the present invention.

FIG. 4 illustrates another example call flow where the codec preference was not supported, but an alternative compression technique is available. In the example of FIG. 4, assume the mobile device 102a and the proxy server 104a are currently in communication (step 402). Further assume that the mobile device 102a prefers to use ROGER or LZSS as the compression mechanism. Thus, in step 404, the mobile device 102a would send an INSU directive containing the codecs representing ROGER and LZSS to the proxy server 104a. However, the proxy server 104a prefers to use SCRIBE as a compression technique. So, in step 406, the proxy server 104a sends a CNS (i.e., "no codec supported") directive back to mobile unit 102a with a codec for SCRIBE. Because the mobile device 102a has the capability to use SCRIBE, the mobile device 102a may respond by sending an SA directive back to the proxy server 104a, which includes the codec for SCRIBE. The compressed data may now be sent (step 410). In this process 21 bytes were added to the overall message flow as overhead to the SIP messaging in long format, or 12 in short format.

Figure 5:
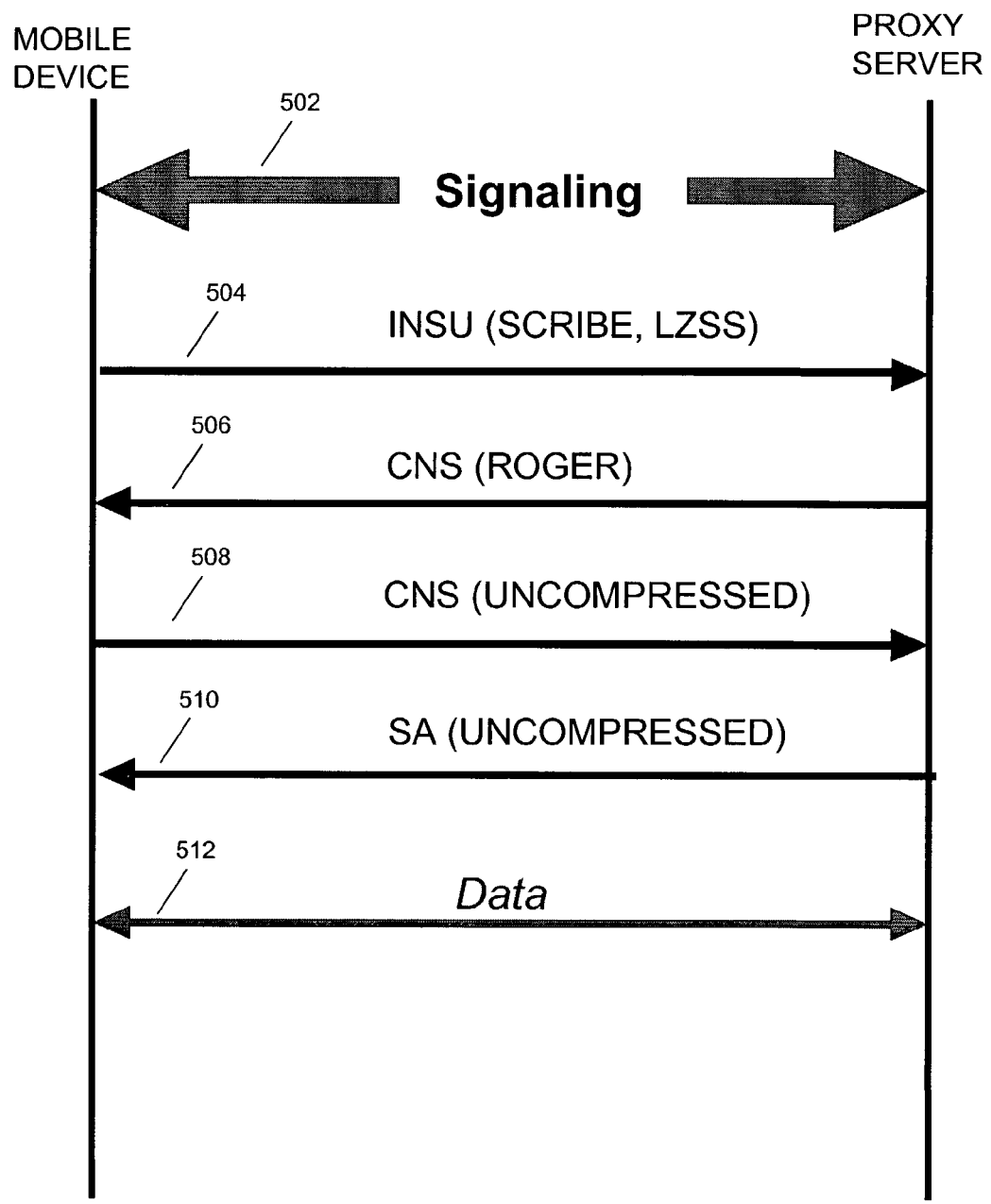
FIG. 5 illustrates a call-flow sequence incorporating another aspect of the present invention.

FIG. 5 illustrates another example of call flow where the codec preference was not supported and there is no alternative compression technique available. In the example of FIG. 5, assume the mobile device 102a and the proxy server 104a are currently in communication (step 502). Further assume that the mobile device 102a prefers to use SCRIBE or LZSS as the compression mechanism. Thus, in step 504, the mobile device 102a sends an INSU directive containing the codecs representing SCRIBE and LZSS to the proxy server 104a. However, the proxy server 104a is not configured to use SCRIBE or LZSS. So, in step 506, the proxy server 104a sends a CNS (i.e., "no codec supported") directive back to mobile unit 102a with a codec for ROGER. Because the mobile device 102a does not have the capability to use ROGER, the mobile device 102a may respond by sending a CNS directive back to the proxy server 104a, which includes the codec for UNCOMPRESSED (step 508). In response, the proxy server 104a sends an SA directive back to the mobile device 102a with the codec for UNCOMPRESSED (step 510). Uncompressed data may now be sent (step 512). In this process 28 bytes are added as overhead to the SIP signaling in long format, or 16 in short format. If the session is an acknowledged session (initiated with an INSA), then either end may wish to reset the session (session reset SR), which causes any dynamic data used by the compression codecs to be reset. The negotiated settings are not affected by this operation. If either end wishes to terminate the negotiated session, they may send a session close (SC) to close the negotiated session. All negotiated settings and codec information will be nullified by this operation. When in an unacknowledged session, the session reset cannot be used, and if received, should always be replied to with a session close. Otherwise, in order to acknowledge the session reset/session close, the recipient echoes the message back to the original sender.

Figure 6:
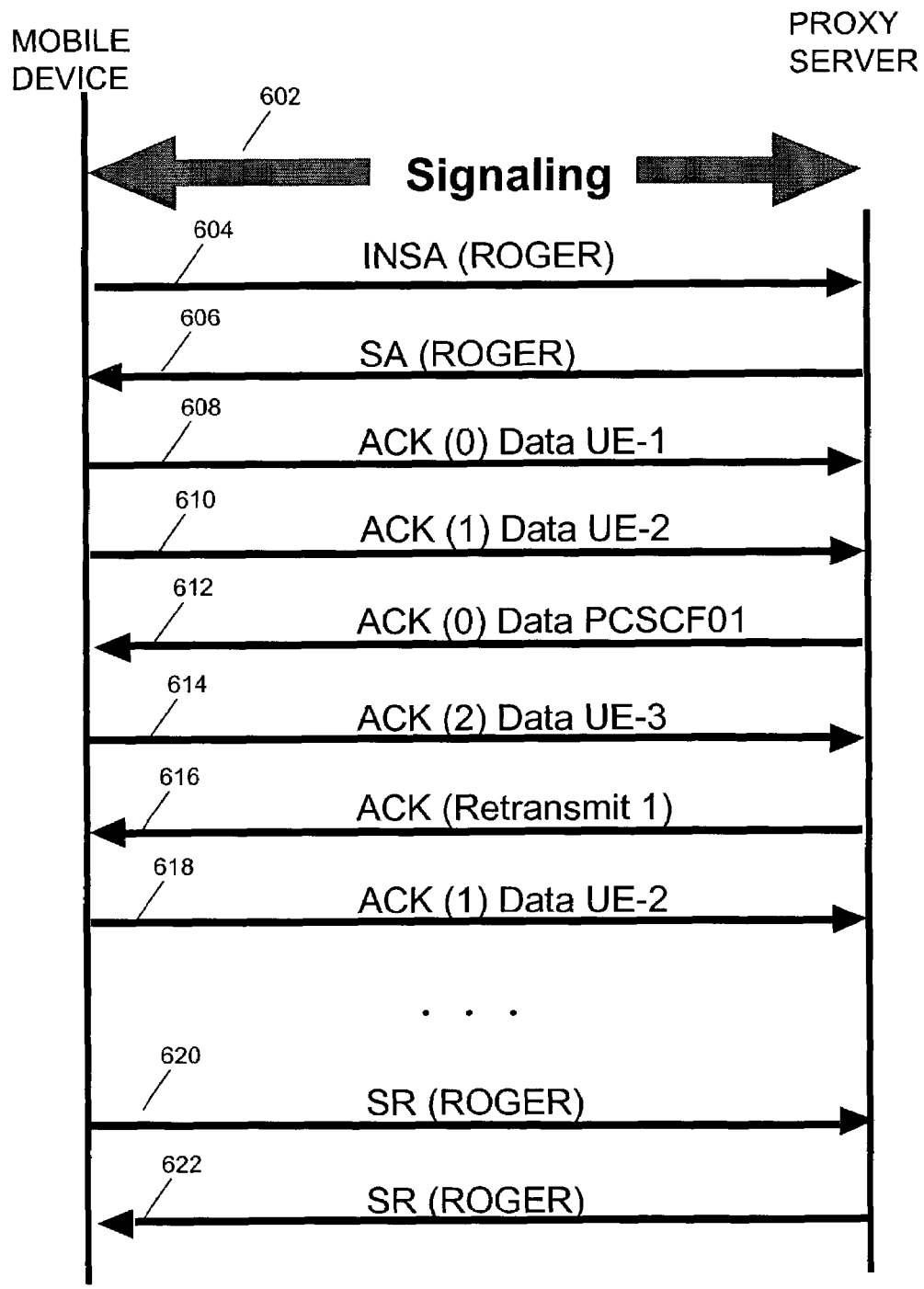
FIG. 6 illustrates a call-flow sequence incorporating another aspect of the present invention.

FIG. 6 illustrates an example of an Acknowledged session that has been properly reset. In the example of FIG. 6, assume the mobile device 102a and the proxy server 104a are currently in communication (step 602). Further assume that the mobile device 102a prefers to use ROGER as the compression mechanism. Thus, in step 604, the mobile device 102a sends an INSU directive containing the codec representing ROGER to the proxy server 104a. In step 606, the proxy server 104a sends an SA directive back to mobile unit 102a with a codec for ROGER. At some point, the mobile device 102a wishes to reset the session and does so in step 620 by sending a SR, which is echoed in step 622 by the proxy server 104a.

Figure 7:
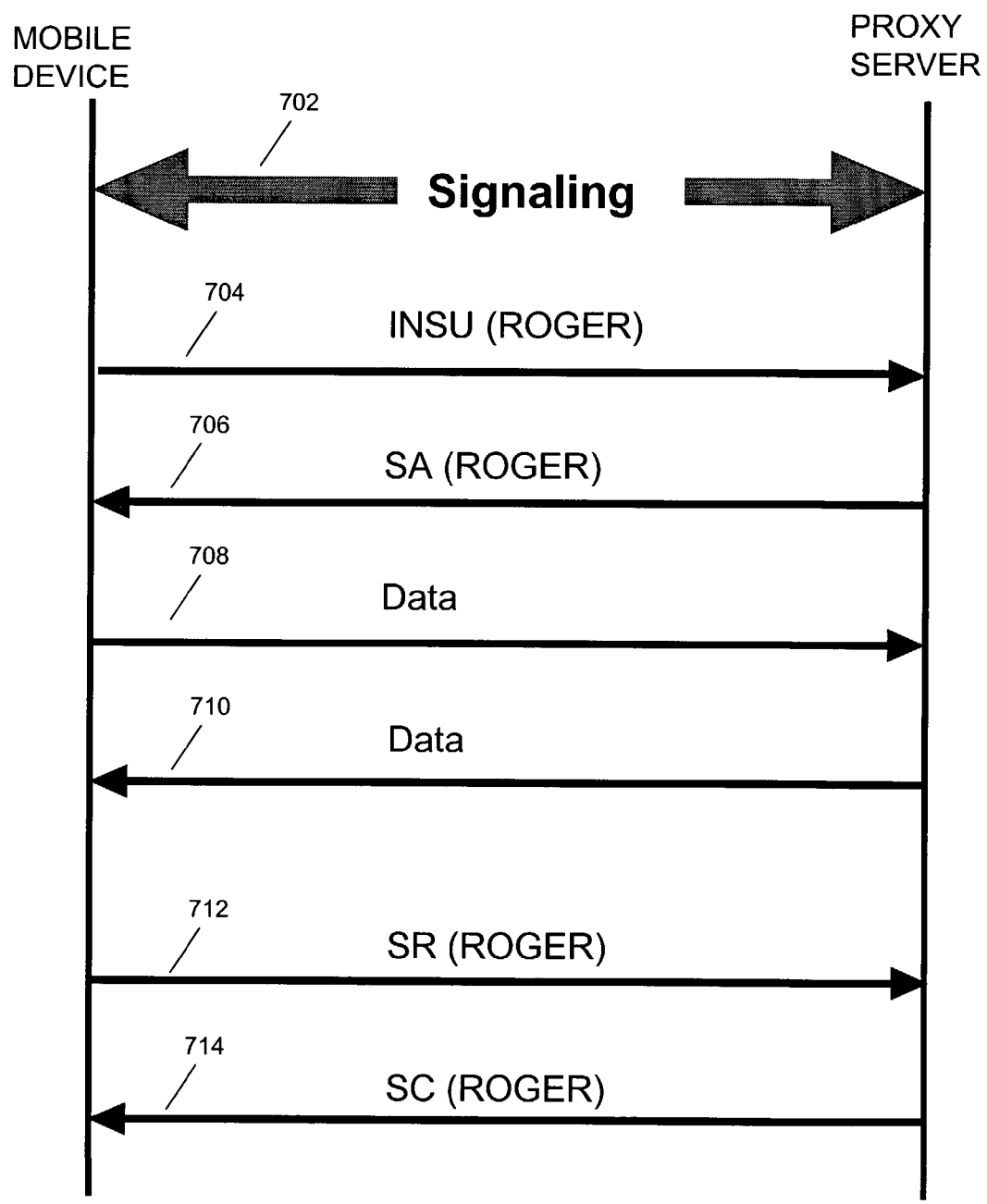
FIG. 7 illustrates a call-flow sequence incorporating an improper sequence.

FIG. 7 illustrates an example of an Acknowledge session that has not been properly reset. In the example of FIG. 7, assume the mobile device 102a and the proxy server 104a are currently in communication (step 702). Further assume that the mobile device 102a prefers to use ROGER as the compression mechanism. Thus, in step 704, the mobile device 102a sends an INSU directive containing the codec representing ROGER to the proxy server 104a. In step 706, the proxy server 104a sends an SA directive back to mobile unit 102a with a codec for ROGER. The mobile device 102a mistakenly sends a session reset during an unacknowledged session in step 712. The proxy server 104a responds by closing the session with a session close (SC) in step 714.

Terminating a compression session is fairly straightforward. In unacknowledged mode, only a Session Close (SC) directive may be sent, as unacknowledged mode should not be used for compression techniques that require any sort of feedback or repair mechanism. In acknowledged mode, however, if one node, such as mobile device 102s wishes to reuse the existing session, but simply wants to dump any dynamic data (such as a compression dictionary that is built up over a series of messages) associated with that session, a Session Reset (SR) may be used instead. If a Session Reset (SR) is received to an unacknowledged session, it may be treated as a Session Close. Upon receipt of a SC or SR directive, the receiver should acknowledge such to the sender by mirroring the request back.

Figure 8:
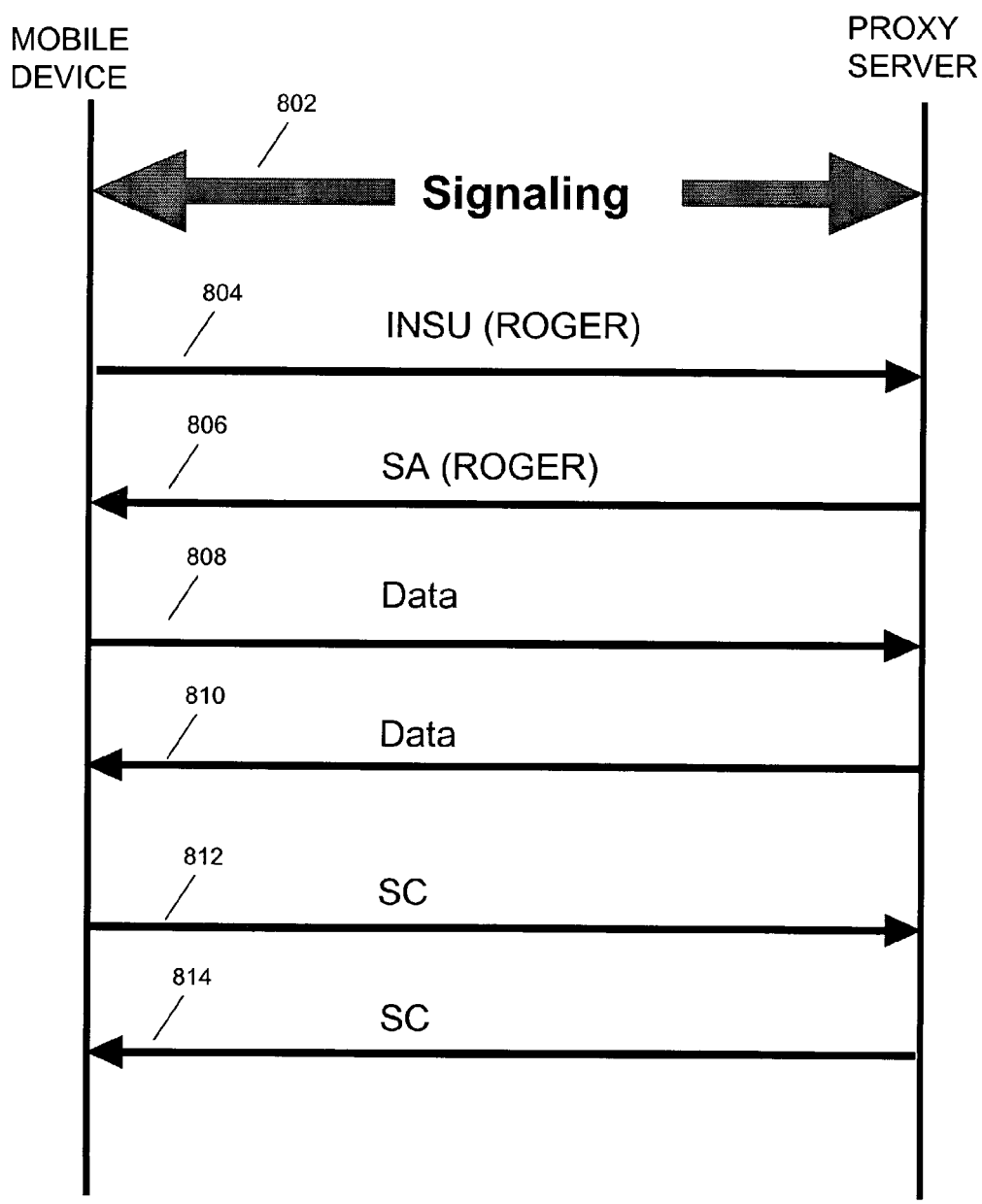
FIG. 8 illustrates a call-flow sequence incorporating another aspect of the present invention.

FIG. 8 is an illustration of an example of an unacknowledged session which is properly closed. In the example of FIG. 8, assume the mobile device 102a and the proxy server 104a are currently in communication (step 802). Further assume that the mobile device 102a prefers to use ROGER as the compression mechanism. Thus, in step 804, the mobile device 102a sends an INSU directive containing the codec representing ROGER to the proxy server 104a. In step 806, the proxy server 104a sends an SA directive back to mobile unit 102a with a codec for ROGER. Compressed data may now be exchanged (steps 808–810). After the data has been exchanged, the mobile device 102a sends a Session Close ("SC") directive to the proxy server 104a. In response, the proxy server 104a sends a SC directive back to the mobile device 102a. Closing a session (SC—SC) adds 12 bytes of overhead to the SIP signaling (SC—SC) in long format, or 6 in short format.

Aspects of the present invention should normally be used over a connection-oriented transport mechanism such as Transmission Control Protocol ("TCP"), especially when used in unacknowledged mode. However, if UDP is used, reliability can still be achieved by retransmitting request directives such as INSA, INSU, SR, SC, etc. until the proper response directive is heard. The length of this retransmission interval may be fairly short in order to have a minimal impact on overall call setup time, without introducing too much addition bandwidth demand. Since the mechanism itself does not depend on the actual retransmission interval, it is left to the implementation to set this timer.

However, some embodiments of the present invention may keep a record of the last request directive, and send the same response directive each time. This way there is no state confusion if retransmissions occur or not, while ensuring that both ends properly retransmit in order to maintain reliability over certain transport mechanisms.

In sum, the embodiments of the present invention have several substantial advantages over the prior art. Among other features, the embodiments do not necessarily need to ride on top of a transport layer protocol in order to operate as it forms a complete protocol in, and of, itself. Other embodiments, understandable by those skilled in the arts of wireless networks, could also be adapted to different layers in the network model such as during PDP context activation, for example. The demands placed on the SIP registration process could be solved by a similar mechanism, in order to determine if embodiments of the present invention are supported at a given end-point, through a multitude of different approaches. Because the first four bytes of the emphemeral header is set to zero, it is impossible for a SIP message that is prefixed with an ephemeral header to begin with a valid alphanumeric ASCII value. Therefore, even if embodiments of the present invention are used without the registration mechanism in place, there is no risk of the ephemeral header being confused as the start of a valid SIP message.

Embodiments of the present invention may allow for negotiation to occur at any SIP message (or with no SIP message at all). Therefore, the codec may change according to the demands of the endpoints. If an endpoint is overloaded processing a particular codec, it can re-negotiate a less demanding codec to be used by closing or resetting the original session, and negotiating a new session, with a new codec to be used. This process also allows for the guessing of a particular codec. In this situation, a new session is initiated (INSA or INSU) with a SIP message body already compressed with the indicated codec as payload. There is no requirement that decompression cannot occur, using a codec indicated in an INSA or INSU, by the recipient, before a session is accepted (SA).

Since the embodiments of the present invention cannot be used as part of a security attack against a node involved in a session because there is no transmitting user-specific data and the use of a session key is limited. Thus, the use of the protocol will not introduce any additional security loopholes into the communication network (that are not already present in SIP).

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A method for negotiating a compression technique while signaling is occurring in a communications network, the method comprising:
    sending a message with a compression negotiation indicator,
    receiving a response to the message,
    determining if the response contains an error code,
    if the message contains the error code, then continuing signaling without using compression techniques,
    if the message does not contain the error code, then negotiating a compression technique to determine a negotiated compression technique and continuing signaling with the negotiated compression technique.

2. The method of claim 1 wherein the negotiating further comprises determining if a compression negotiation was successful,
    if the compression negotiation was successful, then continuing signaling using the negotiated compression technique, and
    if the compression negotiation was not successful, then continuing signaling without using the compression technique.

3. The method of claim 2 wherein the determining further comprises:
    sending an indicator of a preferred compression technique,
    receiving an indicator of a received compression technique,
    determining if the received compression technique is the preferred compression technique,
    if the received compression technique is the preferred compression, then setting the negotiated compression technique to be the preferred compression and defining the compression negotiation to be successful,
    if the compression technique is not the preferred compression technique, then determining if the received compression technique is available,
    if the received compression technique is available, then setting the negotiated compression technique to be the received compression technique and defining the compression negotiation to be successful, and
    if the received compression technique is not available, then defining the compression negotiation to be unsuccessful.

4. The method of claim 1 wherein the sending a message further comprises sending an ASCII message coupled to a binary header.

5. The method of claim 4 wherein the ASCII message is a Session Initiation Protocol message.

6. A network system, comprising:
    a first node of the network system,
    a second node of the network system,
    a memory device coupled to the second node, wherein the memory device includes instructions for:
    sending a message with a compression negotiation indicator,
    receiving a response to the message,
    determining if the response contains an error code,
    if the message contains the error code, then continuing signaling without using compression techniques,
    if the message does not contain the error code, then negotiating a compression technique to determining a negotiated compression technique and continuing signaling with the negotiated compression technique.

7. The network system of claim 6 wherein the negotiating instructions further comprises instructions for:
    determining if a compression negotiation was successful,
    if the compression negotiation was successful, then continuing signaling using the negotiated compression technique, and
    if the compression negotiation was not successful, then continuing signaling without using the compression technique.

8. The network system of claim 7 wherein the determining instructions further comprises instructions for:

sending an indicator of a preferred compression technique, receiving an indicator of a received compression technique, determining if the received compression technique is the preferred compression technique, if the received compression technique is the preferred compression, then setting the negotiated compression technique to be the preferred compression and defining the compression negotiation to be successful, if the compression technique is not the preferred compression technique, then determining if the received compression technique is available, if the received compression technique is available, then setting the negotiated compression technique to be the received compression technique and defining the compression negotiation to be successful, and if the received compression technique is not available, then defining the compression negotiation to be unsuccessful.

9. The system of claim 6 wherein the second node is a proxy server.

10. The system of claim 6 wherein the network uses a session initiation protocol.

11. The system of claim 6 wherein the first node is a communications device.

12. The system of claim 6 wherein the message and the response conform to a common protocol for facilitating negotiation of the compression technique.

13. The system of claim 12 wherein the common protocol contains directives selected from the group consisting of initiating a new session, session acceptance, session reset, session closed, not supported, and check-sum failure.

14. The system of claim 13 wherein the common protocol contains indications of a supported compression technique.

15. A method for negotiating a compression technique during call signaling between two nodes of a Session Initiation Protocol network, the method comprising: receiving from a first node a message containing a session key and a function code, wherein the function code represents a function selected from the group consisting of initiating a new session, session acceptance, session reset, session closed, not supported, check-sum failure, and sending a response to the first node indicating acceptance of the session key.

16. The method of claim 15 wherein the function code further comprises a codec which represents a compression technique.

17. The method of claim 16 wherein the compression technique is selected from a predetermined group, including no compression.

18. The method of claim 15 wherein the message is sent in an acknowledgement mode.

19. The method of claim 15 wherein the message is sent in an un-acknowledgement node.

20. The method of claim 15 wherein the message is part of a SIP signaling message.

* * * * *